A. J. HARPMAN.
PROPELLER DRIVE FOR AEROPLANES.
APPLICATION FILED MAY 26, 1919.
1,329,081.
Patented Jan. 27, 1920.
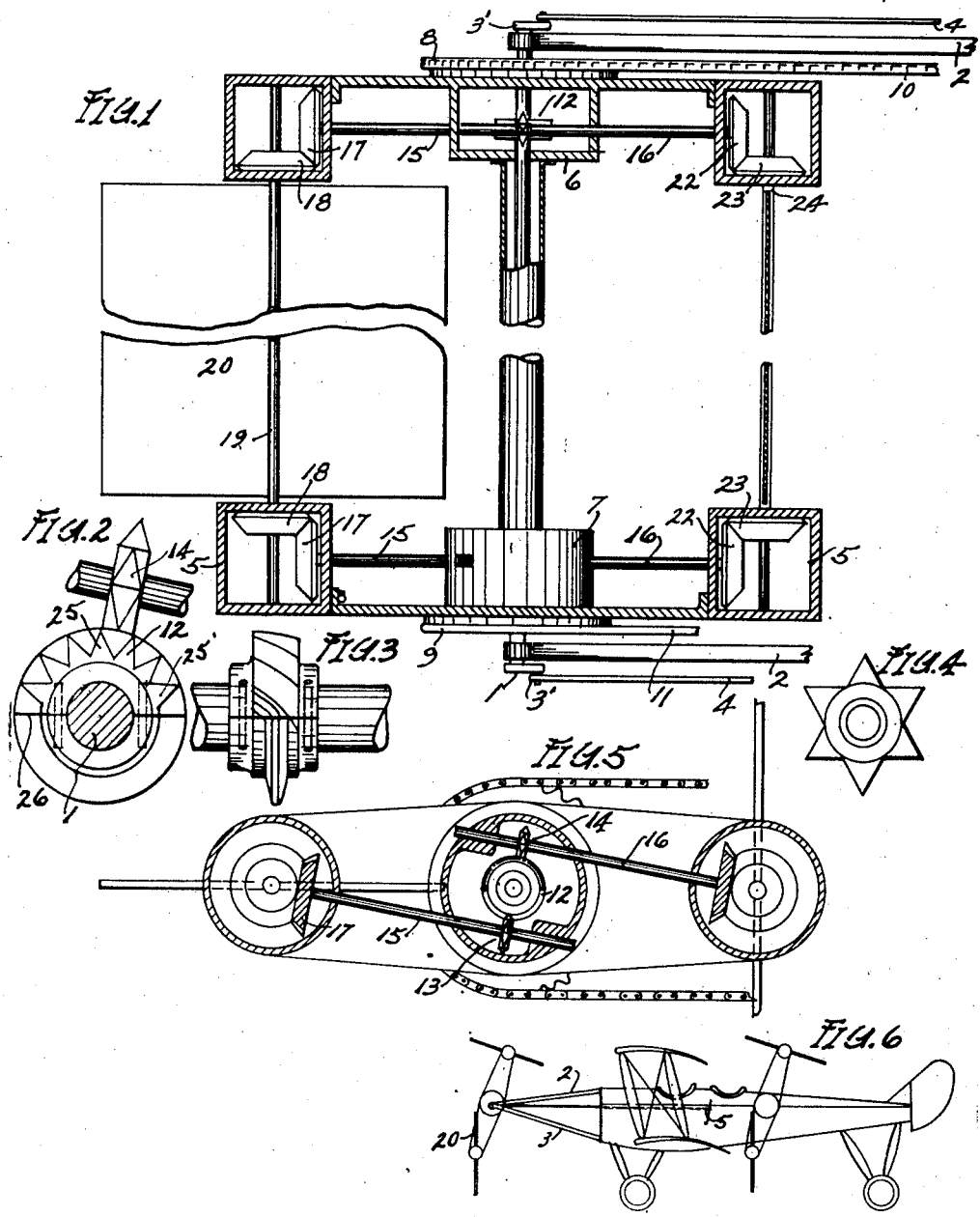
INVENTOR
ALBERT J HARPMAN
BY C.D. Enochs
ATTORNEY

UNITED STATES PATENT OFFICE.

ALBERT J. HARPMAN, OF OWATONNA, MINNESOTA.

PROPELLER-DRIVE FOR AEROPLANES.

1,329,081.  Specification of Letters Patent.  Patented Jan. 27, 1920.

Application filed May 26, 1919. Serial No. 299,969.

*To all whom it may concern:*

Be it known that I, ALBERT J. HARPMAN, a citizen of the United States, and a resident of Owatonna, in the county of Steele and State of Minnesota, have invented certain new and useful Improvements in Propeller-Drives for Aeroplanes, of which the following is a specification.

The general object of my invention is to provide driving means for an aeroplane that will permit the plane taking the air or alighting in smaller areas than is possible with the ordinary type of plane.

A more specific object of my invention is to provide a form of propeller vane with feathering means so the propeller may be brought squarely against the air in one direction and when returning will present the lest possible resistance to the air.

With these and incidental objects in view, the invention consists of certain novel features of construction and combination of parts, the essential elements of which are hereinafter described with reference to the drawing which accompany and forms a part of this specification.

In the drawing, Figure 1 is a sectional plan view of the driving means employed in my invention; Fig. 2 is a sectional detail showing the means of transmitting an interrupted motion to the propeller vane shafts; Fig. 3 is a side view of the interrupted worm wheel; Fig. 4 is an end view of the star wheel coöperating with the worm wheel; Fig. 5 is a section taken on the line 5—5, Fig. 1; and Fig. 6 is a conventional representation of an aeroplane equipped with my form of propeller drive.

As shown in Figs. 1 and 5, the shaft 1 is supported from the fuselage of the plane by braces 2 and 3 on each end of the shaft.

The shaft is journaled in the ends of these braces so it may be rocked by the cranks 3', controlled by rods 4, operated by lever 5, adjacent to the aviator.

Journaled on the shaft 1 are housings 6 and 7, adapted to be driven by sprockets 8 and 9, respectively, the sprockets being attached to the housings. Chains 10 and 11 drive the sprockets from an aeroplane engine not shown.

Keyed to the shaft 1 is a pair of interrupted worm gears 12 and each of the worm gears 12 coöperates with two star wheels 13 and 14.

The star wheels are keyed to shafts 15 and 16, each of the shafts 15 driving a bevel gear 17, coöperating with the bevel gear 18.

The two bevel gears 18 are keyed to the shaft 19 to which the propeller vane 20 is rigidly attached.

Similarly the star wheels 14 are keyed to the shafts 16, driving bevel gears 22, coöperating with bevel gears 23 keyed to the shaft 24, to which the second propeller vane is fastened.

Looking at the detail shown in Fig. 2 it will be seen that when the star wheel 14 is driven around its worm wheel 12 it will be rotated on its own axis while it is coöperating with the worm gear teeth 25, and that when it rotates about the worm wheel 12 to the point 26 its rotation about its own axis will cease, and it will travel around the worm wheel 12 from the point 26 to the next tooth 25' without axial rotation.

It is evident therefore, that as the propeller frame as a whole is rotated by the sprockets driven by the engine the vane 20, Fig. 6, will be drawn through the air and maintained in a vertical position as shown in the figure, while the star wheel 14 is coöperating with the teeth 25 and that when the star wheel reaches the point 26 there will be no further relative motion between the vane and the propeller frame, so the vane will rotate the remainder of its travel in such a position as to offer the least practical resistance to the air in moving away from the aeroplane, and as it reaches the point 25' will again assume a position vertical, as shown in Fig. 6.

It is, of course, apparent that the position of the vane 20 will only be vertical when the aeroplane is horizontal and its motion is controlled by the angular position of the shaft 1 on which the interrupted worm gears are mounted.

Also, it will be noted that through the cranks 3, rods 4, and lever 5 the aviator can control the angular position of the shaft 1, and hence can vary the position of the vanes with respect to the longitudinal axis of the aeroplane.

He may rock the shaft so the vanes will be feathered to give him a maximum lifting effort and a minimum forward propulsion, so as to leave the ground from a small area and after he has risen he may rock the shaft to bring about the greatest forward propulsion effort and the least lifting effort, depending for his lifting force upon the ordinary planes of the aeroplane.

I preferably have two sets of propellers as shown in Fig. 6, so as to equalize the lifting effort and also obtain better forward propulsion.

Claims:

1. In a propeller drive for aeroplanes, the combination of a shaft, a propeller frame rotatably mounted on said shaft, an interrupted worm gear wheel keyed to said shaft, a jack shaft mounted in said frame at substantially right angles to said first named shaft, a star wheel keyed to said jack shaft and coöperating with said worm gear so as to give an interrupted rotary movement to said jack shaft as said frame is rotated around said first named shaft, a propeller vane journaled in said frame, means for rotating said propeller vane driven by said jack shaft.

2. In a propeller drive for aeroplanes, the combination of a shaft, a propeller frame rotatably mounted on said shaft, an interrupted worm gear wheel keyed to said shaft, a jack shaft mounted in said frame at substantially right angles to said first named shaft, a star wheel keyed to said jack shaft and coöperating with said worm gear so as to give an interrupted rotary movement to said jack shaft as said frame is rotated around said first named shaft, a propeller vane journaled in said frame, means for rotating said propeller vane driven by said jack shaft, and means for rocking said first named shaft to change the angular position at which the interrupted motion of said jack shaft is controlled.

ALBERT J. HARPMAN.